United States Patent
Cooke, Jr.

(10) Patent No.: US 6,994,380 B2
(45) Date of Patent: Feb. 7, 2006

(54) HIGH PRESSURE QUICK CONNECT COUPLING AND SEAL

(76) Inventor: Charles M. Cooke, Jr., 5912 Wildflower Rd., Baton Rouge, LA (US) 70817

( * ) Notice: Subject to any disclaimer, the term of this patent is extended or adjusted under 35 U.S.C. 154(b) by 0 days.

(21) Appl. No.: 10/452,268

(22) Filed: Jun. 2, 2003

(65) Prior Publication Data
US 2004/0239116 A1  Dec. 2, 2004

(51) Int. Cl.
*F16L 17/00* (2006.01)

(52) U.S. Cl. .................... 285/354; 285/387; 285/38
(58) Field of Classification Search ............... 285/354, 285/387, 388, 386, 38
See application file for complete search history.

(56) References Cited

U.S. PATENT DOCUMENTS

| 648,232 A | * | 4/1900 | Brandt ..................... 285/354 |
| 869,662 A | | 10/1907 | Snyder |
| 924,039 A | | 6/1909 | Clark |
| 959,960 A | | 5/1910 | Oleson |
| 1,178,714 A | | 4/1916 | Griffin |
| 1,522,999 A | * | 1/1925 | Campbell ................. 285/386 |
| 1,906,826 A | * | 5/1933 | Smith et al. ............. 285/354 |
| 2,067,773 A | * | 1/1937 | Long ........................ 285/386 |
| 2,263,655 A | * | 11/1941 | Stettner ................... 285/388 |
| 2,438,107 A | * | 3/1948 | Babbitt .................... 285/388 |
| 2,726,104 A | * | 12/1955 | Boitnott et al. .......... 285/354 |
| 2,780,483 A | * | 2/1957 | Kessler ..................... 285/354 |
| 3,542,381 A | | 11/1970 | Hait |
| 3,594,022 A | * | 7/1971 | Woodson .................. 285/354 |
| 4,165,106 A | * | 8/1979 | Gladden ................... 285/354 |
| 4,258,936 A | * | 3/1981 | Goldberg .................. 285/388 |
| 4,484,750 A | | 11/1984 | Scruggs |
| 4,659,116 A | * | 4/1987 | Cameron .................. 285/354 |
| 5,082,391 A | | 1/1992 | Florida |
| 5,553,902 A | * | 9/1996 | Powers ..................... 285/354 |

OTHER PUBLICATIONS

Hiltap Fittings Ltd. HT3TL Series Chemical/Solvent Transfer Safe Quick Couplings 4 pages.

* cited by examiner

Primary Examiner—David E. Bochna

(57) ABSTRACT

A quick connect and disconnect pipe coupling and seal assembly including a first generally cylindrical coupling head having a bore therein for connection to a first conduit and a raised annular ring, a second generally cylindrical coupling head having a bore therein for connection to a second conduit, external male threads, and an annular recess for receiving an O-ring, and a generally cylindrical coupling ring for holding the first coupling head therein, the coupling ring having a threaded bore for receipt of the external male threads of the second coupling head to connect the first coupling head to the second coupling head and to force the O-ring received in the annular recess of the second coupling head into contact with the annular ring on the first coupling head to form a high pressure seal between the first coupling head and the second coupling head.

6 Claims, 4 Drawing Sheets

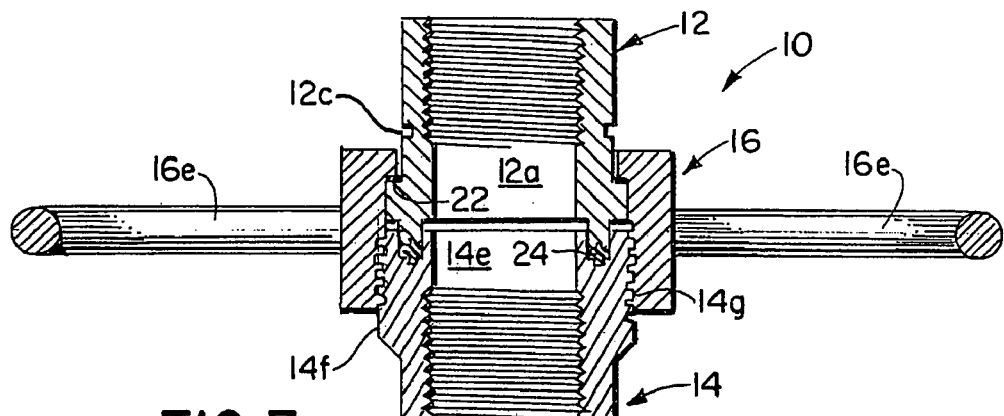
FIG. 3.
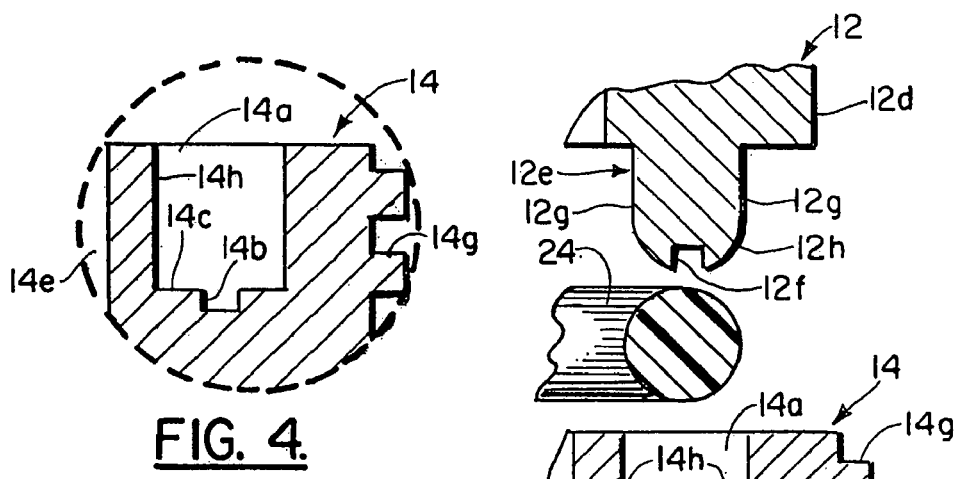
FIG. 4.
FIG. 5.
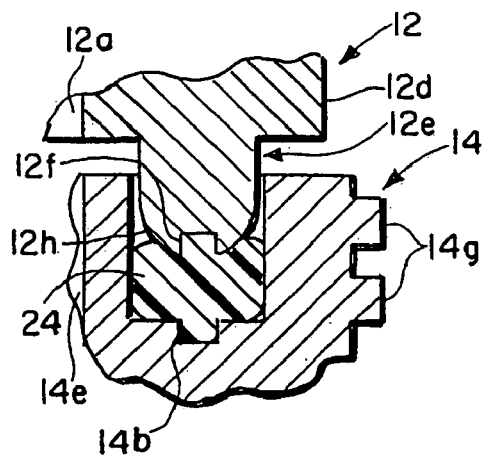
FIG. 6.

HIGH PRESSURE QUICK CONNECT COUPLING AND SEAL

BACKGROUND OF THE INVENTION

1. Field of the Invention

The present invention relates to quick connect couplings. More particularly, the invention is related to quick connect couplings for high pressure pipes and hoses.

2. Description of the Related Art

Pipe coupling assemblies are widely used in the art to convey liquids and gases under pressure to various reservoirs. High pressure storage vessels and tank trucks employ quick connect pipe couplings to connect pipe and hoses to a high pressure vessel to discharge fluids from the high pressure vessel to desired tanks and reservoirs.

Many pipe and hose couplings require large wrenches and great physical effort to connect and disconnect high pressure vessels to reservoirs for the high pressure fluids contained in the high pressure vessels. Many of the fluids in the high pressure vessels are corrosive and can cause damage to the couplings of the prior art and sometimes render the couplings of the prior art unusable in a short period of time, and damaged couplings may leak dangerous fluids to the environment. Furthermore, couplings damaged due to corrosion could explode and result in serious injury to persons and property in the vicinity of the explosion, and pollute the surrounding area with toxic chemicals. Chlorine gas is an example of a widely used industrial gas stored under high pressure which is toxic to humans and can cause damage to the environment, and which is very corrosive to common pipe couplings.

Exemplary of the pipe couplings of the related art are the following U.S. Patents: U.S. Pat. Nos. 869,662; 924,039; 959,960; 1,178,714; 3,542,381; 4,484,750; and 5,082,391.

BRIEF SUMMARY OF THE INVENTION

In accordance with the present invention there is provided a quick connect pipe coupling and seal assembly which is corrosion resistant and can be quickly and easily connected to a conduit such as a pipe or hose and disconnected therefrom with minimal physical effort.

The quick connect pipe coupling and seal assembly of the invention includes a first generally cylindrical coupling head having a threaded bore therein for connection to a first threaded hose or pipe and a raised annular ring with a curved outer edge having a groove therein, a second generally cylindrical coupling head having a threaded bore for connection to a second threaded hose or pipe and external male threads thereon, the second coupling head having an annular recess for receiving an O-ring on the end thereof with a central groove in its end face, and a generally cylindrical coupling ring for holding the first coupling head captive therein, the coupling ring having a threaded bore for receipt of the external male threads of the second coupling head to force the O-ring held in the annular recess of the second coupling head into contact with the raised annular ring on the first coupling head to form a high pressure seal between the first coupling head and the second coupling head, the coupling ring having handles extending from the exterior thereof for quickly connecting and disconnecting the first coupling head from the second coupling head with little physical effort.

BRIEF DESCRIPTION OF THE SEVERAL VIEWS OF THE DRAWINGS

FIG. 3 is a cross-sectional view of the quick connect coupling of the invention taken along lines 3—3 of FIG. 1;

FIG. 4 is a detailed, cross-sectional view of the portion of FIG. 2 circled in dotted lines indicated by the numeral 4;

FIG. 5 is a detailed, partly cut-away, partly cross-sectional exploded view of a portion of the first coupling head, O-ring, and second coupling head axially aligned for connection;

FIG. 6 is a detailed, partly cut-away, partly cross-sectional exploded view of a portion of the first coupling head, O-ring, and second coupling head after connection to the coupling ring.

DETAILED DESCRIPTION OF THE INVENTION

Figure 1:
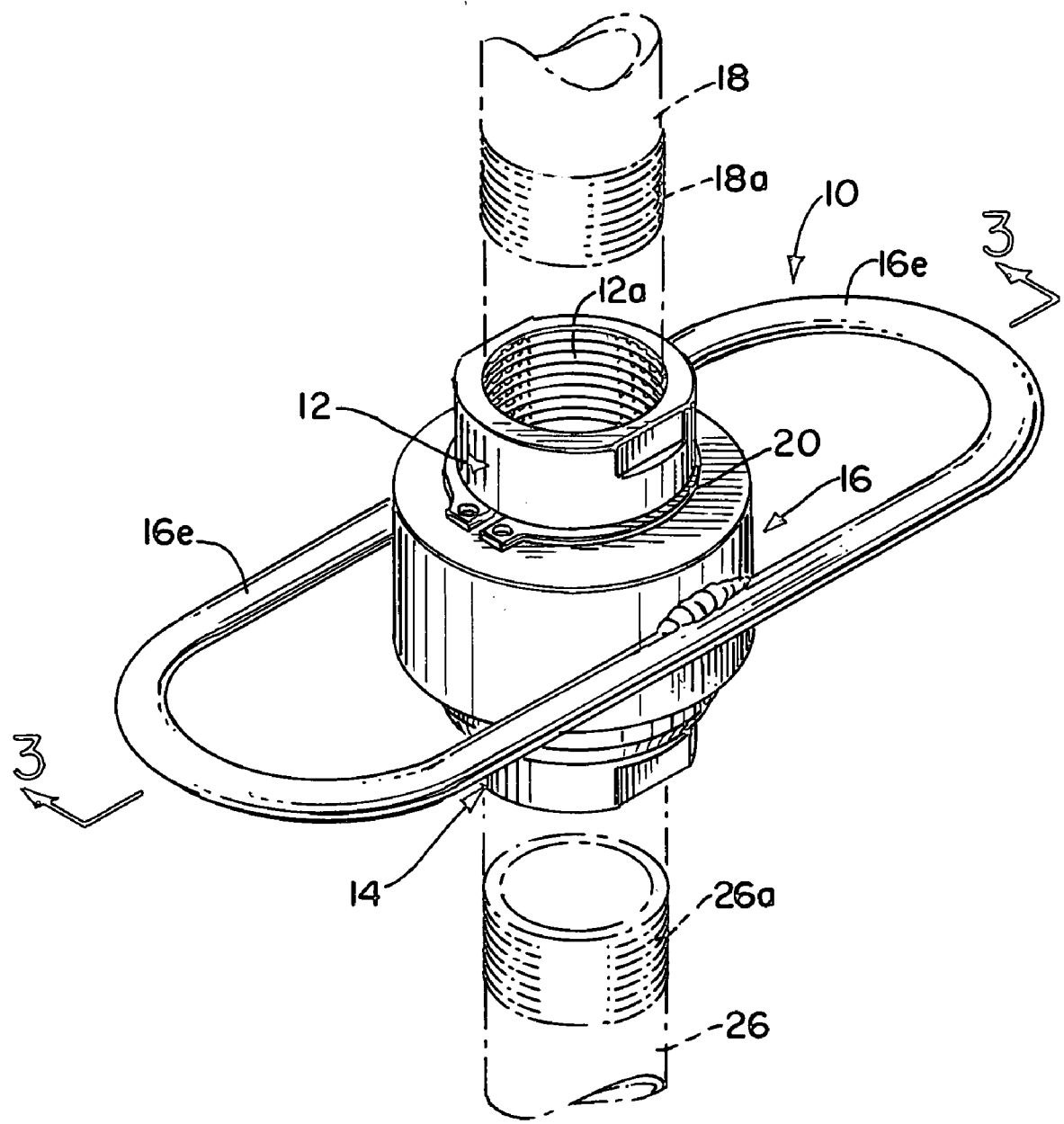
FIG. 1 is a perspective view of the quick connect coupling of the invention having two pipes shown in phantom lines aligned therewith for connection thereto.

Referring now to the drawings, and in particular to FIG. 1, the quick connect coupling assembly of the invention is generally indicated by the numeral 10. Coupling assembly 10 includes a first coupling head generally indicated by the numeral 12, a second coupling head generally indicated by the numeral 14, and a coupling ring generally indicated by the numeral 16. The coupling heads 12 and 14, snap ring 20, and the coupling ring 16, are constructed from corrosion resistant materials.

Figure 2:
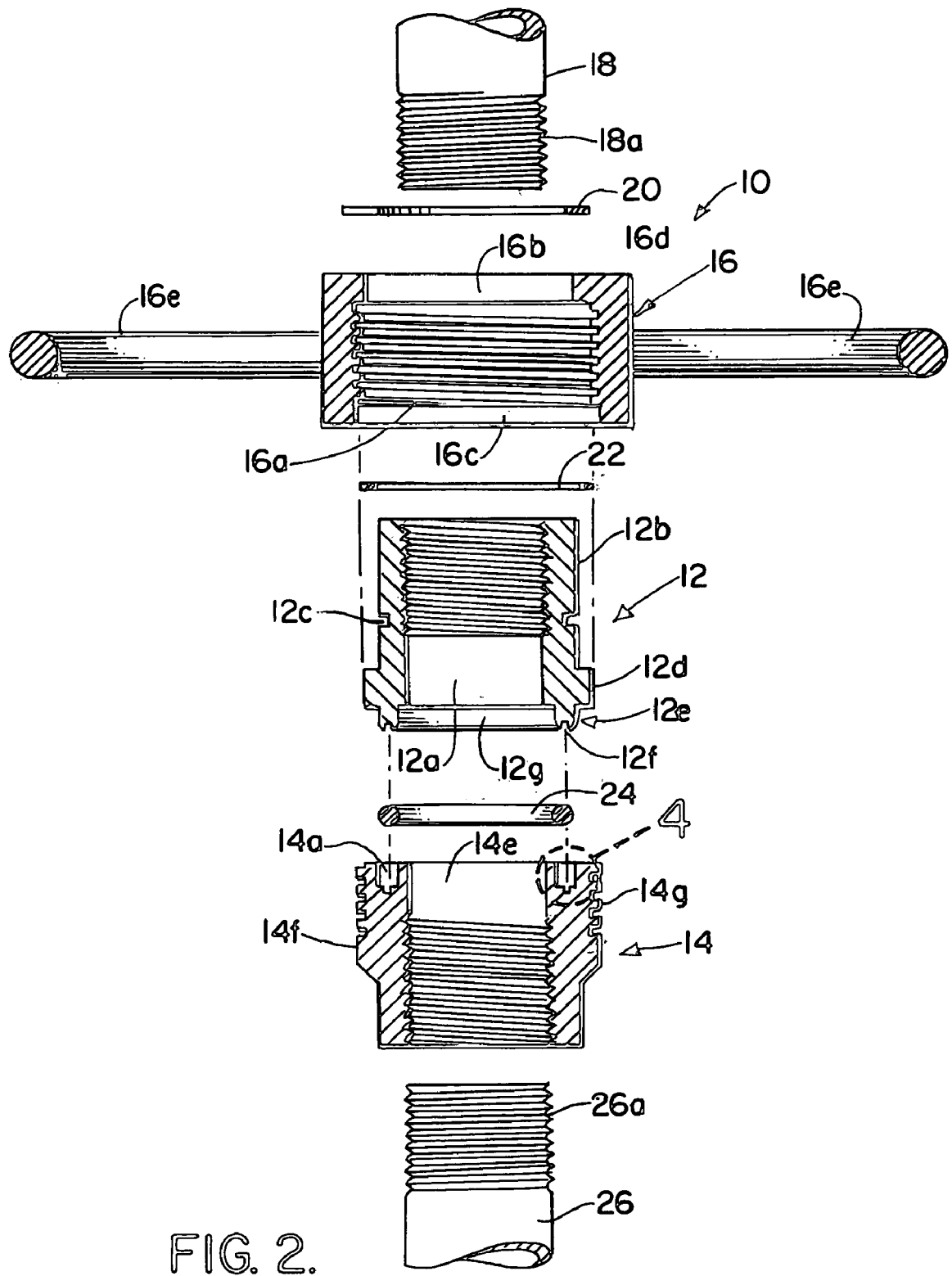
FIG. 2 is an exploded cross-sectional view of the quick connect coupling of the invention taken along lines 3—3 of FIG. 1.

As shown in FIGS. 1–3, coupling head 12 is generally cylindrical in shape and has female threads 12a surrounding a female threaded central bore 12a for receipt of the male threads 18a on pipe 18. Coupling head 12 has a cylindrical outer wall 12b having a circular slot 12c axially aligned therewith extending therearound for receipt of snap ring 20. Snap ring 20 is a conventional metal snap ring well known in the art which functions to hold coupling head 12 inside coupling ring 16 when coupling head 14 is not completely threaded into female threads 16a of coupling ring 16.

Coupling head 12 has a circular shoulder 12d at the lower end of outer wall 12b on which circular bearing 22 is placed prior to inserting coupling head 12 into the cylindrical bore 16b of cylindrical coupling ring 16. Circular bearing 22 functions to reduce friction between shoulder 16d and shoulder 12d to reduce the amount of torque necessary to turn coupling ring 16. Cylindrical bore 16b has an inner surrounding shoulder 16d against which circular bearing 22 is forced by shoulder 12d of coupling head 12 when coupling head 14 is completed threaded into female threads 16a of coupling ring 16.

As shown in detail in FIGS. 5 and 6, coupling head 12 has a raised annular ring generally indicated by the numeral 12e having a central groove 12f on the curved or rounded outer end 12h thereof. The inner and outer side walls 12g—12g of raised annular ring 12e are parallel as shown in FIGS. 5 and 6. As shown in FIGS. 5 and 6, outer end 12h has a curved or rounded semi-circular cross-section.

Coupling head 14 is generally cylindrical in shape and has a female threaded central bore 14e for receipt of the male threads 26a on pipe 26. Coupling head 14 has a cylindrical outer wall 14f having male threads 14g on the upper portion thereof for engaging female threads 16a of coupling ring 16.

Coupling head 14 has an annular recess 14a shown in detail in FIG. 4 having a central groove 14b on its end face 14c which receives sealing gasket 24. Sealing gasket 24 is preferably a conventional elastic O-ring well known in the art which is not effected by the gases encountered in the environment in which the O-ring is utilized. However, if desired, other gasket material with other conventional cross-sectional shapes can be used. The inner and outer side walls 14h—14h of annular recess 14a are parallel and receive inner and outer walls 12g—12g shown in detail in FIGS. 5 and 6 of raised annular ring 12e therebetween.

As shown in FIG. 6, a high pressure seal is made between coupling head 12 and coupling head 14 by flexible O-ring 24 when, as shown in FIG. 3, coupling head 12 is placed in coupling ring 16 and coupling head 14 is fully threaded into coupling ring 16. There is no metal-to-metal seal between the inner and outer side walls 14h—14h and the inner and outer walls 12g—12g of raised annular ring 12e. Coupling ring 16 preferably has two lateral loop handles 16e—16e which are rigidly connected to the outer surface thereof by welding or the like to aid in manipulating, securing and unfastening coupling assembly 10. However, loop handles 16e—16e could be eliminated and any conventional means could be used to rotate coupling ring 16.

To assemble the coupling assembly 10, bearing 22 is placed on top of shoulder 12d of coupling head 12, and coupling head 12 is inserted into the bores 16b and 16c of coupling ring 16. Snap ring 20 is then placed in slot 12c around coupling head 12, thereby loosely connecting coupling head 12 to coupling ring 16. Coupling head 12 is then threaded onto pipe 18 and coupling head 14 is threaded onto pipe 26. O-ring 24 is placed in annular recess 14a of coupling head 14, and the male threads 14g of coupling head 14 are threaded into female threads 16a of coupling ring 16 by grasping and rotating handles 16e until raised annular ring 12e is forced in O-ring 24 as shown in FIG. 6 to form a high pressure seal between coupling head 12 and coupling head 14. As coupling ring 16 is threaded onto coupling head 14, the curved semi-circular cross-section of outer end 12h of raised annular ring 12e contacts and compresses O-ring 24 as shown in FIG. 6 and forces part of O-ring 24 into grooves 12f and 14b for an increased high pressure seal. It is important that outer end 12h of raised annular ring 12e has a curved cross-section for greater penetration into O-ring 24 to achieve an increased high pressure seal and for producing, in addition to a downward force component on O-ring 24, a lateral force component on O-ring 24 to force O-ring 24 against sidewall 14h of groove 14a and upward around the curved or rounded outer end 12h of raised annular ring 12e.

Figure 7:
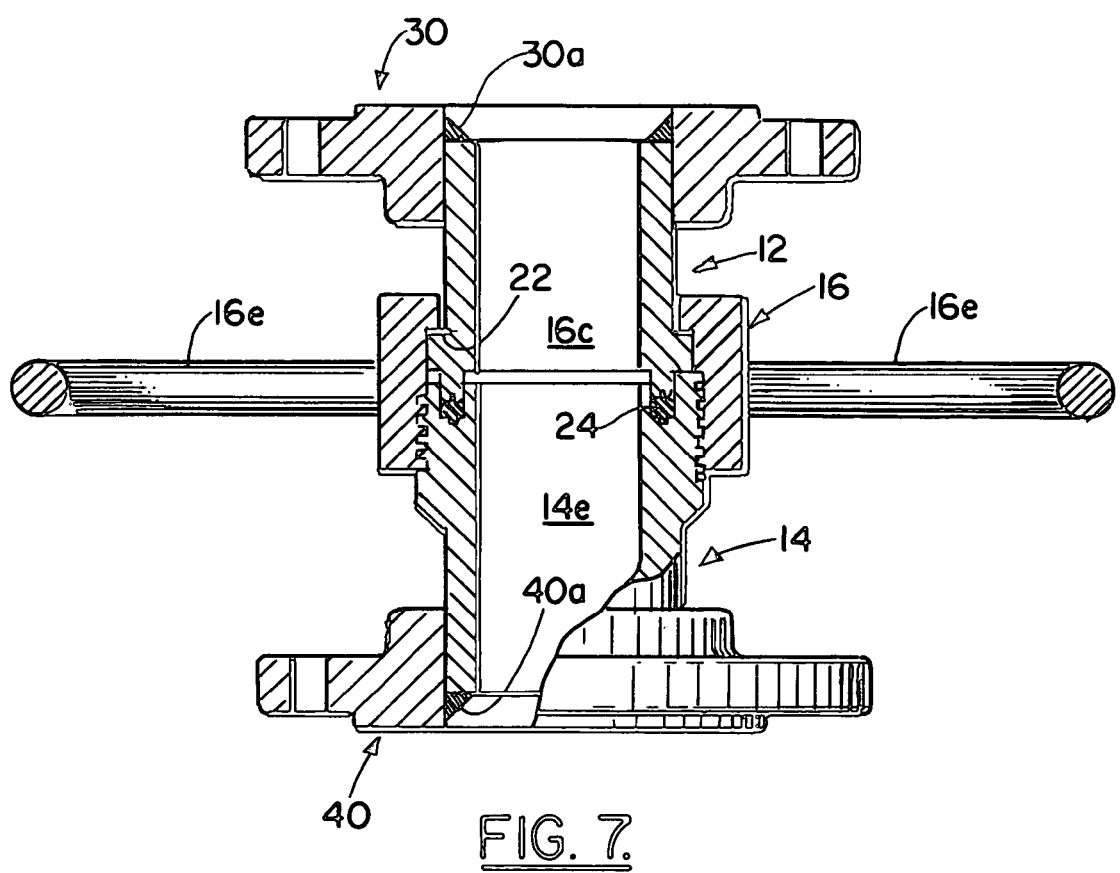
FIG. 7 is a cross-sectional view of the second embodiment of the quick connect coupling of the invention.

In FIG. 7 of the invention is shown an alternate embodiment of the invention wherein conventional pipe flange 30 is welded at 30a to coupling head 12 when it is desired to used coupling assembly 10 to connected to a pipe or hose having a flange, and wherein conventional pipe flange 40 is welded at 40a to coupling head 14 when it is desired to used coupling assembly 10 to connected to a pipe or hose having a flange. The remainder of the components of the coupling assembly shown in FIG. 7 are the same as those explained above except that the female threads in the bore of coupling heads 12 and 14 are deleted, and have like reference numerals.

Although the preferred embodiments of the invention have been described in detail above, it should be understood that the invention is in no sense limited thereby, and its scope is to be determined by that of the following claims:

What is claimed is:

1. A quick connect and disconnect stationary pipe coupling assembly comprising:
   a. a first generally cylindrical coupling head having a bore therein for connection to a first conduit having external threads thereon, said first coupling head having a raised annular ring extending around one end of said bore, said bore in said first coupling head having female threads therein for connecting a threaded conduit thereto, said raised annular ring having a curved semi-circular outer edge, said curved semi-circular outer edge of said raised annular ring having a groove therein, said raised annular ring having parallel sidewalls, said first coupling head having an annular shoulder extending around said coupling head adjacent to said annular ring,
   b. a second generally cylindrical coupling head having a bore therein for connection to a second conduit, external male threads, and an annular recess extending around one end of said bore for receiving an O-ring and said raised annular ring, said annular recess having an end face with a groove therein, said annular recess having two parallel sidewalls extending perpendicularly from said end face, said two parallel sidewalls of said annular recess having a distance therebetween greater than the distance between said parallel sidewalls of said raised annular ring of said first coupling head to prevent said two parallel sidewalls of said annular recess from contacting said parallel sidewalls of said raised annular ring of said first coupling head, said bore in said second coupling head having female threads therein for connecting a threaded conduit thereto, and
   c. a generally cylindrical coupling ring for holding said first coupling head therein, said coupling ring having a threaded bore for receipt of said external male threads of said second coupling head to connect said first coupling head to said second coupling head and to force said O-ring received in said annular recess of said second coupling head into contact with said annular ring on said first coupling head to form a high pressure seal between the first coupling head and said second coupling head, said coupling ring having handles extending from the exterior thereof for connecting and disconnecting said first coupling head from said second coupling head.

2. The coupling assembly of claim 1 wherein said first conduit is a pipe having external threads thereon.

3. The coupling assembly of claim 1 wherein said second conduit is a pipe having external threads thereon.

4. The coupling assembly of claim 1 wherein said first coupling head has a groove therein for receipt of a snap ring for connecting said second coupling to said coupling ring.

5. A quick connect and disconnect stationary pipe coupling assembly comprising:
   a. a first generally cylindrical coupling head having a threaded bore therein for connection to a first threaded conduit and a raised annular ring extending around one end of said bore, said raised annular ring having a curved semi-circular outer edge, said curved semi-circular outer edge of said raised annular ring having a groove therein, said raised annular ring having parallel sidewalls, b. a second generally cylindrical coupling head having a bore therein for connection to a second threaded conduit, external male threads, and an annular recess extending around one end of said bore for receiving an O-ring, said annular recess having an end face with a groove therein and two parallel sidewalls extending perpendicularly from said end face, said two parallel sidewalls of said annular recess having a distance therebetween greater than the distance between said parallel sidewalls of said raised annular ring of said first coupling head to prevent said two parallel sidewalls of said annular recess from contacting said parallel sidewalls of said raised annular ring of said first coupling head, and c. a generally cylindrical coupling ring for holding said first coupling head therein, said coupling ring having a threaded bore for receipt of said external male threads of said second coupling head to connect said first coupling head to said second coupling head and to force said O-ring received in said annular recess of said second coupling head into contact with said annular ring on said first coupling head to form a high pressure seal between the first coupling head and said second coupling head, said coupling ring having handles extending from the exterior thereof for connecting and disconnecting said first coupling head from said second coupling head.

6. A seal assembly for a stationary pipe coupling comprising:

a. a first coupling member having a bore therein for connection to a first conduit and a raised annular ring extending around one end of said bore, said raised annular ring having a curved outer edge, said curved outer edge of said raised annular ring having a groove therein, said raised annular ring having parallel sidewalls, b. a second coupling member having a bore therein for connection to a second conduit and an annular recess extending around one end of said bore for receiving an O-ring, said annular recess having an end face and said end face having a groove therein, said annular recess having two parallel sidewalls extending perpendicularly from said end face, said two parallel sidewalls of said annular recess having a distance therebetween greater than the distance between said parallel sidewalls of said raised annular ring of said first coupling head to prevent said two parallel sidewalls of said annular recess from contacting said parallel sidewalls of said raised annular ring of said first coupling head, and c. a third coupling member for connecting said first coupling member to said second coupling member.

* * * * *